(12) United States Patent
Tanaka

(10) Patent No.: US 10,841,438 B2
(45) Date of Patent: Nov. 17, 2020

(54) GUIDE DEVICE, CONTROL SYSTEM, AND RECORDING MEDIUM

(71) Applicant: KONICA MINOLTA, INC., Tokyo (JP)

(72) Inventor: Ryohei Tanaka, Yokohama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/552,130

(22) Filed: Aug. 27, 2019

(65) Prior Publication Data

US 2020/0112646 A1  Apr. 9, 2020

(30) Foreign Application Priority Data

Oct. 3, 2018 (JP) ................. 2018-188383

(51) Int. Cl.
| | | |
|---|---|---|
| *H04N 1/00* | (2006.01) |
| *G06F 3/01* | (2006.01) |
| *G06F 3/041* | (2006.01) |
| *G06F 3/038* | (2013.01) |
| *G09B 21/00* | (2006.01) |
| *G06F 3/0488* | (2013.01) |

(52) U.S. Cl.
CPC ......... *H04N 1/00392* (2013.01); *G06F 3/014* (2013.01); *G06F 3/0383* (2013.01); *G06F 3/0488* (2013.01); *G06F 3/04162* (2019.05); *G09B 21/004* (2013.01); *H04N 1/00411* (2013.01); *H04N 1/00514* (2013.01); *G06F 2203/0384* (2013.01)

(58) Field of Classification Search
CPC ........... H04N 1/00392; H04N 1/00411; H04N 1/00514; G06F 3/014; G06F 3/04162; G06F 3/0383; G06F 3/0488; G06F 2203/0384; G09B 21/004

USPC ....................................................... 358/1.13
See application file for complete search history.

(56) References Cited

U.S. PATENT DOCUMENTS

| | | | |
|---|---|---|---|
| 2004/0174337 A1* | 9/2004 | Kubota ................... | G06F 3/016 345/156 |
| 2006/0119578 A1* | 6/2006 | Kesavadas ............ | G06F 3/0481 345/161 |
| 2012/0050779 A1* | 3/2012 | Tani .................... | H04N 1/00482 358/1.13 |
| 2016/0063765 A1* | 3/2016 | Yoshida ................. | G06T 11/00 345/633 |
| 2016/0269736 A1* | 9/2016 | Holstun ............. | H04N 1/32149 |
| 2018/0220017 A1* | 8/2018 | Miyazaki ........... | H04N 1/00474 |
| 2019/0004604 A1* | 1/2019 | Wang .................... | G06F 3/0426 |
| 2020/0050342 A1* | 2/2020 | Lee ..................... | G06F 3/04845 |

FOREIGN PATENT DOCUMENTS

| | | |
|---|---|---|
| JP | 2000172408 A | 6/2000 |
| JP | 2004271748 A | 9/2004 |

* cited by examiner

*Primary Examiner* — Allen H Nguyen
(74) *Attorney, Agent, or Firm* — Holtz, Holtz & Volek PC

(57) ABSTRACT

In a case where a predetermined region to perform a next operation on an operation screen relative to a touch position onto a touch panel is made a destination, a guide device makes a force sense presenter generate a guide-use virtual force sense directed to the destination by using relative position information, received from a main body apparatus, up to the destination relative to the touch position.

26 Claims, 13 Drawing Sheets

GUIDE DEVICE, CONTROL SYSTEM, AND RECORDING MEDIUM

CROSS-REFERENCE TO RELATED APPLICATION

The entire disclosure of Japanese patent application No. 2018-188383, filed on Oct. 3, 2018, is incorporated herein by reference in its entirety.

BACKGROUND

1. Technical Field

The present invention relates to a guide device, a control system, and a recording medium which a visually impaired person can use.

2. Description of Related Arts

Generally, with normal touch panels, visually impaired persons cannot perform operation. For such a problem, in Patent Literature 1 (JP 2004-271748A), a touch panel apparatus capable of switching a normal mode and a visually impaired person mode is disclosed. In this apparatus, a user switches a mode to the visually impaired person mode by wearing a headphone or operating a decision switch. Successively, in the visually impaired person mode, when the user touches a touch panel, only the touched position information is notified to a control device without notifying touch information to the control device. The control device guides screen information corresponding to the position information by voice, and then, if the screen information is the desired screen information, the user turns ON a decision switch other than the touch panel. In response to the ON of the decision switch, the touch panel apparatus notifies the control device of the touch information, whereby it is made possible to perform an operation similar to that in the normal mode.

Moreover, in Patent Literature 2 (JP 2000-172408A), an input device to be used by a user having worn a finger cap capable of performing wireless communication is disclosed, and the following processes are executed. Upon touching a touch panel by the user having worn a finger cap, on the touch panel side, a braille matrix signal corresponding to information on an operation type at the coordinate position of the touch is transmitted to the finger cap. Then, on the finger cap side, a three-dimensional braille pattern corresponding to this braille matrix signal is generated inside. The user recognizes the kind of a button (key) by tracing the braille pattern on the inside.

SUMMARY

In the field of information devices, executable functions are increasing year by year, and then, the number of buttons for performing setting relative to respective functions is also increasing. Moreover, the number of the buttons to be displayed on one operation screen is also increasing.

In the techniques disclosed by Patent Literatures 1 and 2, in order to look for a button to be operated next, it is necessary to examine a plurality of buttons on an operation screen one by one, which is not user-friendly.

The present invention has been achieved in view of the above-mentioned circumstances, and an object is to provide a guide device, control system, and recording medium in which even in a case of using an operation screen where a plurality of buttons are arranged, a visually impaired person can grasp easily a predetermined region to be operated next without being confused by operation.

To achieve the abovementioned object, according to an aspect of the present invention, a guide device to which one aspect of the present invention is reflected, is a visually impaired person-use guide device that is worn on a hand of a user and is able to communicate with a main body apparatus equipped with a touch panel to detect a touch onto an operation screen, the guide device includes a force sense presenter that makes the user having worn generate a virtual force sense, a guide device communicator that performs wireless communication with the main body apparatus, and a guide device processor that, in a case where a predetermined region to perform a next operation on the operation screen relative to a touch position onto the touch panel is made a destination, performs a guide control to make the force sense presenter generate a guide-use virtual force sense directed to the destination by using relative position information, received from the main body apparatus, up to the destination relative to the touch position.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
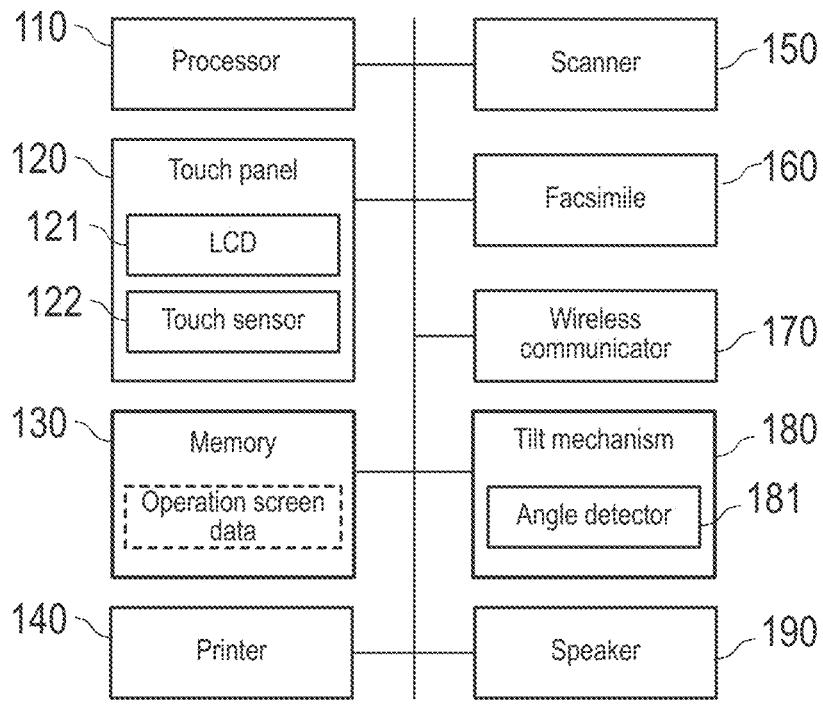
FIG. 1 is a block diagram showing a hardware constitution of a main body apparatus.

Hereinafter, with reference to attached drawings, an embodiment of the present invention will be described in detail. Incidentally, in the description for the drawings, the same constitutional element is provided with the same reference symbol, and the overlapping description is omitted. Moreover, the dimensional ratios in the drawings are exaggerated on account of description, and, may be different from the actual ratios.

Figure 2:
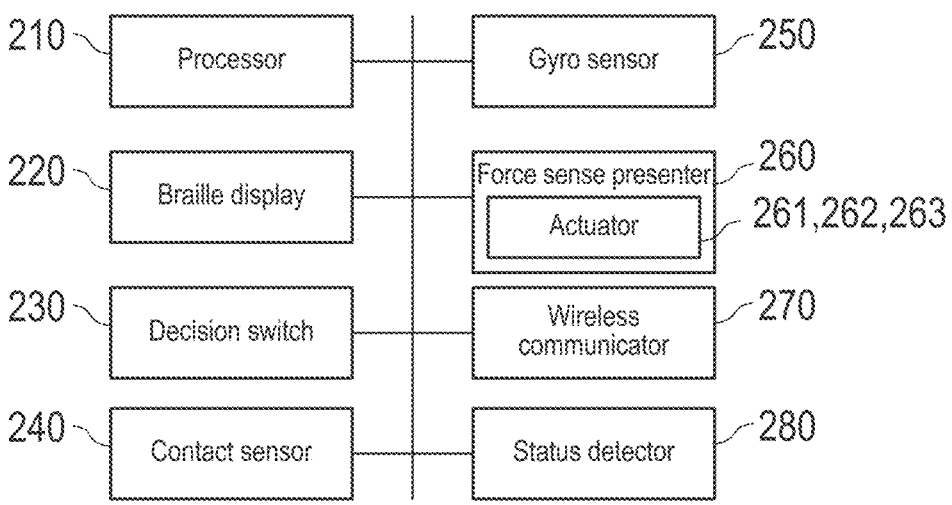
FIG. 2 is a block diagram showing a hardware constitution of a guide device.
Figure 3:
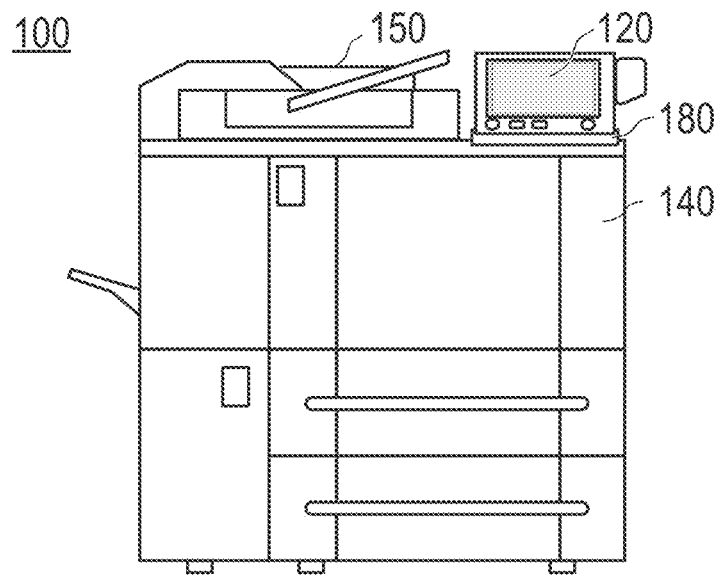
FIG. 3 is an illustration showing an appearance of the main body apparatus.
Figure 4:
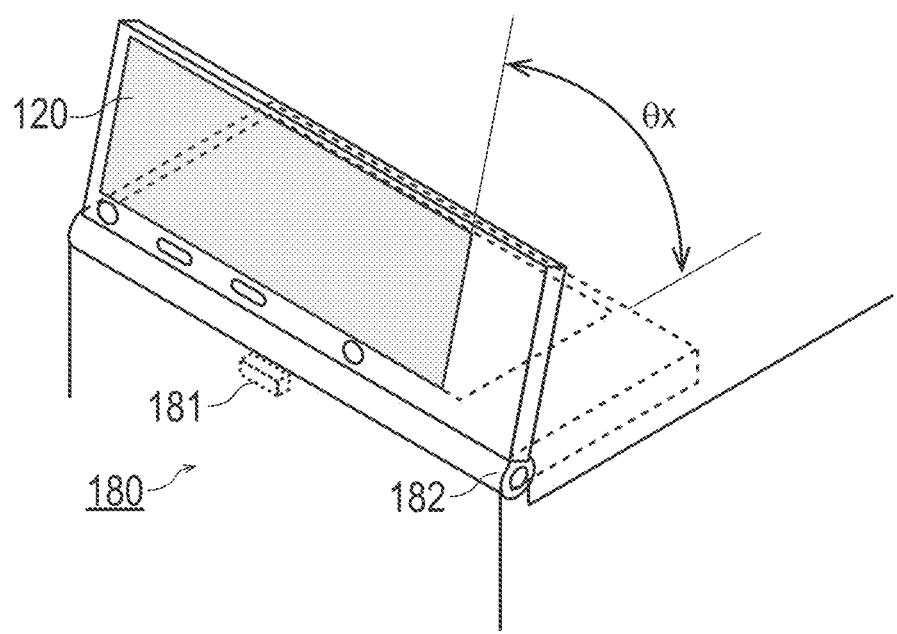
FIG. 4 is a perspective view showing a touch panel equipped with a tilt mechanism.

FIG. 1 is a block diagram showing a hardware constitution of a main body apparatus 100, FIG. 2 is a block diagram showing a hardware constitution of a guide device 200 (also, referred to as a "braille device"), FIG. 3 is an illustration showing an appearance of the main body apparatus 100, and FIG. 4 is a perspective view for describing a constitution of a tilt mechanism 180. FIGS. 5A, 5B, 6, 7, and 8 each is an illustration showing a constitution of the guide device 200 and so on. As shown in these drawings, the control system 500 includes the main body apparatus 100 and the guide device 200.

(Main Body Apparatus 100)

The main body apparatus 100 is, for example, a composite machine (MFP: Multifunctional Peripheral). As shown in FIG. 1, the main body apparatus 100 includes a processor 110 (main body processor), a touch panel 120, a memory 130, a printer 140, a scanner 150, a facsimile 160, a wireless communicator 170, a tilt mechanism 180, and a speaker 190.

The processor 110 includes a central processing unit (CPU). The memory 130 includes an auxiliary memory device, such as RAM (Random Access Memory), ROM (Read Only Memory), and HDD (Hard Disk Drive). The ROM stores various programs and various kinds of data beforehand, and the RAM memorizes a program and data temporarily as a work region. The CPU controls the whole main body apparatus 100 in accordance with programs. The memory 130 memorizes a plurality of operation screens including operation screens with a hierarchical structure, the setting of operation prohibited regions for each operation screen, and braille image data.

The touch panel 120 is also referred to as a touch screen or an operation panel, and includes a LCD 121 including a liquid crystal screen and a touch sensor 122 that is superimposed on this and detects an operation of a finger of a user.

The touch sensor 122 is, for example, an electrostatic capacitance type detector. In the case where a user's finger comes in contact with a surface of the touch panel 120, the touch sensor 122 detects existence or nonexistence of contact of the finger and its contact position (coordinates) on the basis of a change of electrostatic capacitance. Moreover, the touch sensor 122 corresponds also to detection of simultaneous touch (multi-touches) with a plurality of fingers.

The printer 140 forms an image on a sheet with a well-known electrophotographying system or ink jet system on the basis of print data.

The scanner 150 includes an original document glass on which an original document is placed, a light source that irradiates light to the original document, an optical system such as a lens, and an optical element, such as a CCD that generates image data from reflected light. The scanner 150 reads out an image on an original document placed on the original document glass or an image on an original document conveyed by an automatic document conveying apparatus and generates image data.

The facsimile 160 includes a modem and a data accessor. The modem is connected to the data accessor and a communication line network, such as a telephone line. The data accessor has a function that outputs a pulse signal corresponding to a counter party's telephone number. The facsimile 160 performs transmission of image data with a facsimile of a counter party through a communication line network.

The wireless communicator 170 functions as a "main body communicator". The wireless communicator 170 includes a wireless communication interface, such as BLE (Bluetooth Low Energy), Bluetooth (registered trademark), IEEE802.11, IrDA. Moreover, as short-distance wireless communication, used may be communication methods, such as FeliCa (registered trademark), ISO/IEC 14443 (communication method of MIFARE (registered trademark)), and ISO/IEC 18092 (NFC: Near Field Communication). In this connection, separately from the above wireless communication interface, as wired interfaces, the main body apparatus 100 may include an interface, such as an interface for LAN connection according to standards, such as Ethernet (registered trademark) and FDDI, a serial interface, such as USB and IEEE 1394, and a parallel interface, such as SCSI and IEEE1284.

As shown in FIG. 3 and FIG. 4, on the front side of the main body apparatus 100, the tilt mechanism 180 attached to a main body panel supports the touch panel 120 such that an installation angle of a display surface of the touch panel 120 is changeable. A user can change an installation angle, while having the touch panel 120, by changing its orientation. The tilt mechanism 180 is provided with an angle detector 181 including an actuator and a photo sensor. The installation angle θx can be changed, for example, within a range of 0 to 90 degrees, and the angle is detected by the angle detector 181 with a resolution of several steps (for example, five steps).

The speaker 190 outputs voice. In concrete terms, a user, such as a visually impaired person, is notified of information on the display contents of an operation screen to be displayed on a display surface of the touch panel 120 by voice.

(Guide Device 200)

Figure 5A:
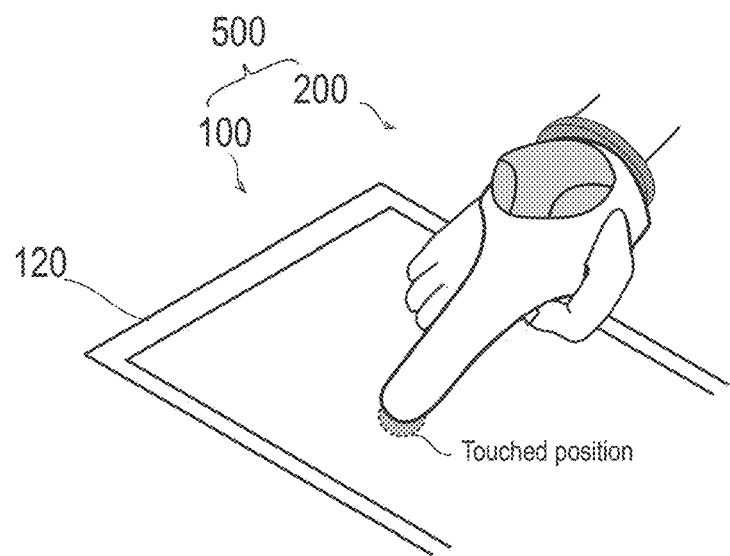
FIG. 5A is a perspective view showing a state where the touch panel is touched with the guide device.
Figure 5B:
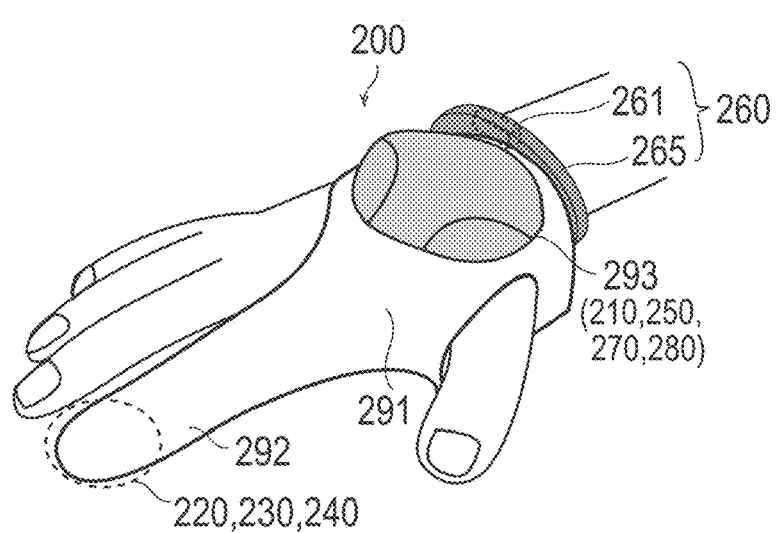
FIG. 5B is a perspective view showing an appearance of the guide device.
Figure 6:
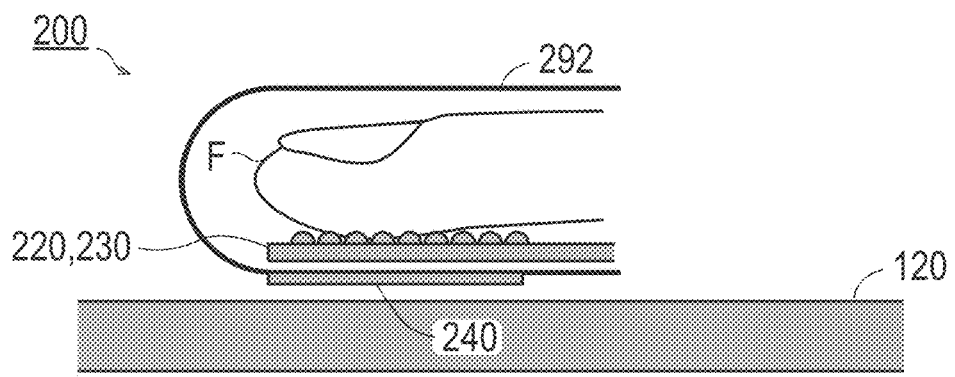
FIG. 6 is a cross-sectional schematic illustration of a periphery of a finger cover.
Figure 7:
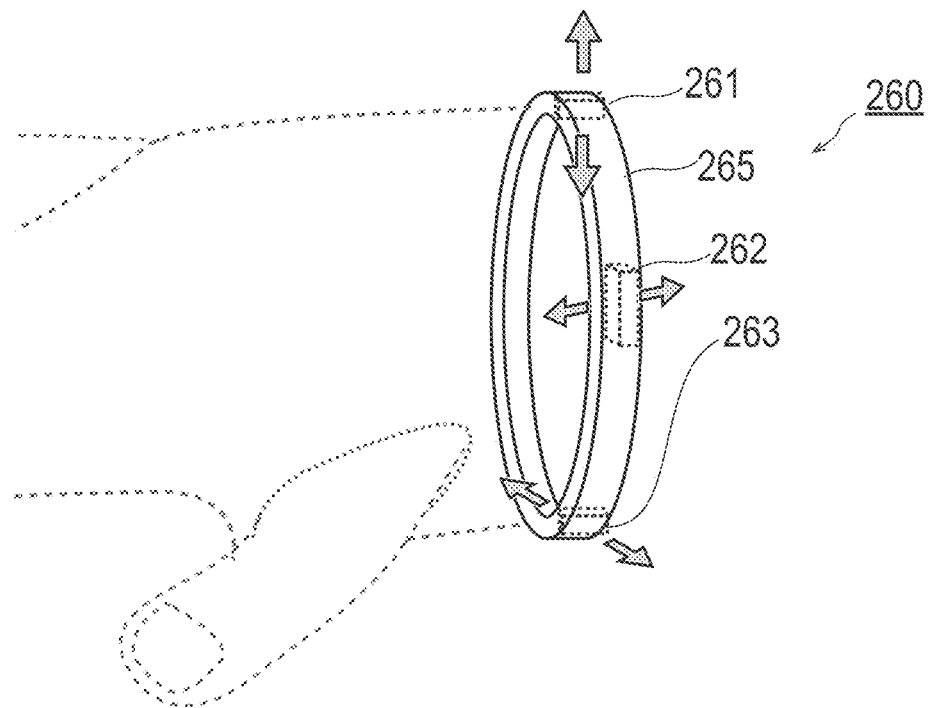
FIG. 7 is an illustration showing a direction (axis) in which a virtual force sense is generated by each actuator of a force sense presenter of the guide device.

FIG. 5A is a perspective view showing a state where a touch panel is touched with the guide device 200, FIG. 5B is a perspective view showing an appearance of the guide device 200, and FIG. 6 is a sectional view of a periphery of a finger cover. The guide device 200 includes a processor 210 (guide device processor), a braille display 220, a decision switch 230 for a selection operation, a contact sensor 240, a gyro sensor 250, a force sense presenter 260, a wireless communicator 270, and a state detector 280.

As shown in FIG. 5A and FIG. 5B, the guide device 200 is worn on a hand of a user, such as a visually impaired person. The guide device 200 includes a glove main body 291, a finger cover 292 that covers an index finger in a state of having been worn, a unit case 293 provided on a portion corresponding to the back of a hand of this glove main body 291, and a main body 265 connected to a wrist side of the glove main body 291. The guide device 200 is worn on a user's hand with a wrist band (not shown) of the glove main body 291. Moreover, the main body 265 of the force sense presenter 260 that transmits a virtual force sense to a user in a state of having been worn, is attached so as to come in contact with a user's wrist.

On a tip portion of the finger cover 292, there are provided a braille display 220, a decision switch 230, and a contact sensor 240. Moreover, in the inside of the unit case 293, there are provided a processor 210, a gyro sensor 250, and a wireless communicator 270. In the main body 265, respective electronic components of the force sense presenter 260 are stored. Electric power is supplied to these electronic components such as the processor 210 from a secondary battery (not shown) provided in the unit case 293.

(Processor 210)

The processor 210 includes a CPU, a RAM, and a ROM. The wireless communicator 270 functions as a "guide device communicator" and communicates with the wireless communicator 170 of the main body apparatus 100 by wireless communication. This hardware constitution is the same as that of the processor 110, and description for it is omitted.

(Braille Display 220)

The braille display 220 is disposed inside the finger cover 292 and displays (embodies) a three-dimensional braille pattern that makes a user cause the feel of braille. In a cross-sectional schematic illustration of a periphery of the finger cover 292 shown in FIG. 6, the braille display 220 is provided with a large number of pins that makes a fingertip feel a tactile sense, and an amount of protrusion, in a height direction, of each of the pins can be changed individually by a piezoelectric element. The density (resolution) of the pins is constituted with a density higher than the pitch (2 to 3 mm) of general braille, and in addition to a braille pattern, it is possible to display text information and a simple image.

(Decision Switch 230)

The decision switch 230 is a pressure sensor disposed so as to be superimposed on the braille display 220. In the case where a predetermined pressure or more is detected by the pressure sensor due to a matter that a user pushes a finger F downward, the processor 210 determines that the decision switch 230 has been turned ON (operated or pushed down) by the user. In this connection, the decision switch 230 is not limited to this and may be a tact switch that is operated by a free hand. Moreover, in that case, this tact switch may be disposed on an upper portion of the unit case 293.

(Contact Sensor 240)

The contact sensor 20 is disposed at a position corresponding to a belly of a finger of the finger cover 292 and detects a matter that the outside of the finger cover 292 comes in contact with an object, such as a surface of the touch panel 120. The contact sensor 240 may be, for example, a mechanical sensor, such as a microswitch or a pressure sensor, or may be an optical sensor. Moreover, in the case of using a pressure sensor, the pressure sensor may be made to determine such that, in the case where the finger cover 292 has come in contact with an object with a predetermined pressure or more, the finger cover 292 has contacted. In the case where an operator having worn the guide device 200 has touched a certain object such as the touch panel 120 with a tip of the finger cover 292, the contact sensor 220 detects the touch.

Moreover, by comparing a contact timing detected by the contact sensor 240 with a detection timing of the touch panel 120 (touch sensor 122), it may be made to determine whether a touch for the touch panel 120 has been made by the guide device 200. For example, the processor 110 determines with the following techniques.

(a) The guide device 200 monitors the output of the contact sensor 240 and transmits sensor information, i.e., information on a contact timing onto a certain object, to the main body apparatus 100 in real time. It is preferable to perform transmission of the sensor information in a predetermined cycle, for example, a cycle of several tens Hz. (b) The processor 110 of the main body apparatus 100 detects a touch by the guide device 200 to the touch panel 120 of a self-apparatus. At this time, the detection of a touch is made by determining whether a waveform that shows a contact timing of the sensor information in (a) transmitted from the guide device 200 and a waveform that shows a timing of a touch onto the touch panel 120 are the same or not. In concrete terms, in the case where a timing when a state of non-contact has changed to a state of contact in the sensor information of the contact sensor 240 and a signal waveform showing continuation of the subsequent touch coincide with a signal waveform when a touch has been detected in the main body apparatus 100, it is determined that the touch has been made by the guide device 200. For example, in the case of receiving sensor information in a cycle of 60 Hz from the guide device 200, if a timing when the state of non-contact has changed to the state of contact is the same cycle or has a difference within about one cycle (about 16 msec), it is possible to determine that the touch has been made by the guide device 200.

In this connection, in the description of the control method in each embodiment described in the below, on the basis of the above-mentioned comparison in detection timing, the main body apparatus 100 determines whether a touch has been made by the guide device 200 or not. However, in a period when short-distance wireless communication (BLE standard etc.) has been established between the main body apparatus 100 and the guide device 200, in the case where a touch has been made to the touch panel 120 by a certain object, it may be deemed that the touch has been made by the guide device 200 of a visually impaired person.

(Gyro Sensor 250)

The gyro sensor 250 functions as a position detector. The gyro sensor 250 is attached to the guide device 200 and detects a 3-axis angular velocity of the guide device 200. By integrating the detected angular velocity, a relative position and orientation (or direction) of the guide device 200 can be detected. In this connection, in place of the gyro sensor 250, the position detector may be constituted by an accelerometer or together with the gyro sensor 250, and it may be made that a relative position is detected by the accelerometer.

The processor 210 makes a touch position on the touch panel 120 and "a relative estimated position" of the gyro sensor 250 with respect to a touch position (fingertip) at the time of having touched, a reference position and continues detecting a relative position with respect to this reference position. This "relative estimated position" has been memorized beforehand in a memory of the processor 210 and is obtained from an average form (attitude) of the guide device 200 at the time of having touched the touch panel 120 while stretching a finger (refer to FIG. 5A). For example, in the case of having worn the guide device 200 on a right hand and having touched the touch panel 120 with a fingertip, usually, a position of a wrist being a generation place (main body 265) of a virtual force sense is located at about dozen centimeters on a right near side from a fingertip and at a position (upper portion) several centimeters higher than the display surface of the touch panel 120. In this connection, with regard to the shape of this guide device 200, as mentioning later, the state detector 280 continues to grasp the shape, whereby a change in the shape can be corrected.

(Force Sense Presenter 260)

The force sense presenter 260 generates a virtual force sense directed to any direction for a user wearing the guide device 200 by the control of the processor 210. The force sense presenter 260 includes three actuators 261, 262, and 263 and a main body 265 that stores these actuators. The actuators 261, 262, and 263 are arranged so as to generate respective virtual force senses directed to directions different from each other. For example, the actuators 261, 262, and 263 generate the respective virtual force senses directed to the directions of the X-axis, the Y-axis, and the Z-axis that are orthogonal to each other. The magnitude of the virtual force sense to be generated by each of the actuators 261, 262, and 263 is controlled by the magnitude of the drive voltage.

Figure 8:
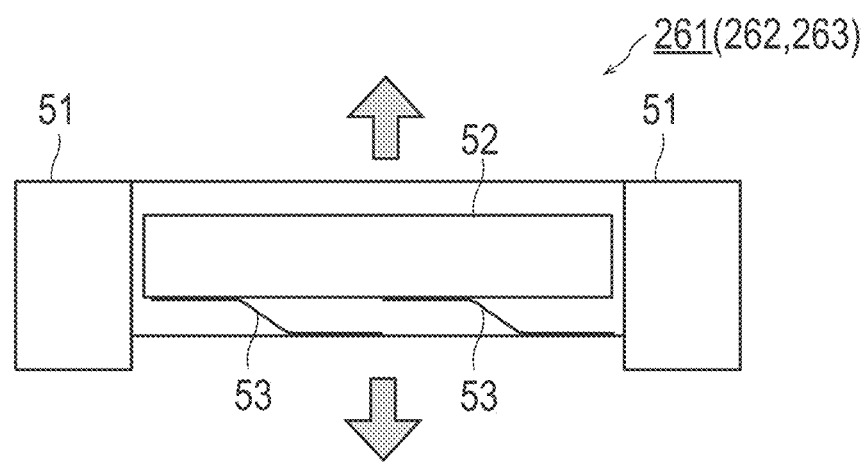
FIG. 8 is a schematic illustration showing an internal structure of the actuator.

FIG. 8 shows an example of a structure of the actuator 261 (actuators 262 and 263 have the same structure) that generates a virtual force sense. The actuator includes a magnet(s) 51, a coil 52, and a spring(s) 53. By giving a periodic signal as a drive signal, the coil 52 vibrates electromagnetically, and further, the vibration is made larger by the resonance of the spring 53. In the case where a pulse width modulation (PWM) signal with a duty ratio of 0.5 is made to input as a drive signal, it becomes possible to cause vibration with a fixed cycle. In this connection, a virtual force sense does not occur by vibration of a fixed cycle.

In order to generate a virtual force sense, by making the duty ratio of a drive signal, for example, 0.8, it becomes possible to generate vibration of asymmetrical acceleration, whereby a virtual force sense can be generated. Moreover, relative to the direction when the duty ratio is 0.8, when the duty ratio is 0.2, it is possible to generate a virtual force sense in an opposite direction. The direction of an arrow in FIG. 7 and FIG. 8 becomes a direction in which a human perceives a virtual force sense.

Moreover, whether a virtual force sense is generated in the direction of + of each axis or whether a virtual force sense is generated in the direction of −, is controlled by a duty ratio of the PWM modulation. A user wearing the guide device 200 perceives a virtual force sense in which virtual force senses generated by the three actuators 261, 262, and 263 have been vector-synthesized. The processor 210 controls virtual force senses generated in the three actuators 261, 262, and 263, whereby it is possible to generate a virtual force sense of an arbitrary direction and magnitude corresponding to a guide vector. At this time, the processor 210 may control such that as a distance to a destination is longer, a virtual force sense is made larger.

(Wireless Communicator 270)

The wireless communicator 270 functions as a "guide device communicator" and communicates with the wireless communicator 170 of the main body apparatus 100 by wireless communication. This constitution is similar to that of the wireless communicator 170, and description for it is omitted.

(State Detector 280)

The state detector 280 detects a shape state and torsion state (orientation) of the guide device 200 (also referred to as an "attitude"). In concrete terms, a shape state, such as a state where an index finger has been bent, a state where an index finger has been stretched, and a state where an index finger has been twisted, are detected by the state detector 280. As a constitution, for example, the state detector 280 is one in which a plurality of thread-like electrodes is disposed in the finger cover 292 and the glove main body 291. The processor 210 grasps a shape state on the basis of the output from the state detector 280 and grasps a distance between a tip position of the finger cover 292 and the force sense presenter 260. For example, correspondingly to the state of having bent the index finger, the state of having stretched, or the state of having twisted, a distance and orientation between a tip position of the finger cover 292 and the force sense presenter 260 will become different.

(Example of Braille Pattern)

Figure 9:
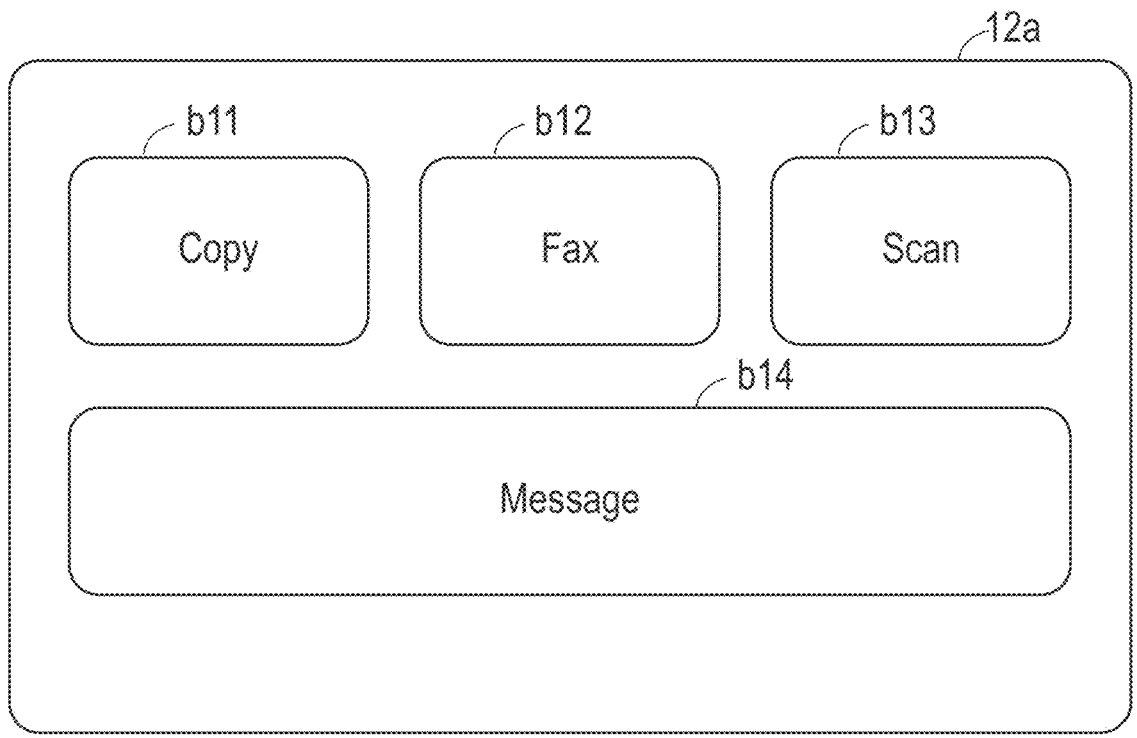
FIG. 9 is an example of an operation screen to be displayed on the touch panel.
Figure 10:
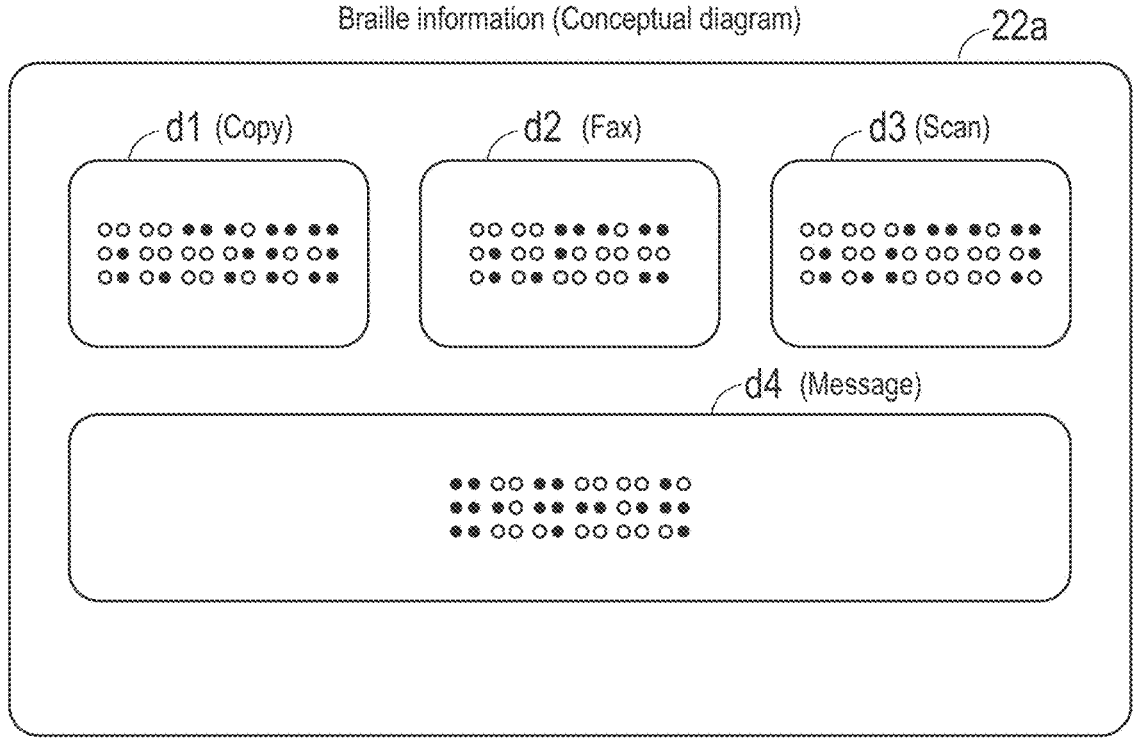
FIG. 10 is a conceptual diagram showing an operation screen (braille image) for braille corresponding to FIG. 9.

Hereafter, with reference to FIG. 9 and FIG. 10, an example of braille patterns displayed on the braille display 220 are described. FIG. 9 shows an example of an operation screen 12a displayed on the touch panel 120. In this connection, on the actual operation screen, as mentioned later, many buttons (also referred to as manual operation buttons, operation keys, or icons) are disposed, in FIG. 9, an operation screen is made a simple screen example for the sake of description. On the operation screen, a plurality of operation buttons b11 to b14 (hereafter, these are also collectively called "button b") are arranged and displayed visually. FIG. 10 is an operation screen 22a (braille image) for braille that shows braille image data d1 to d4 (hereafter, these are also collectively called "braille image data d") used for braille corresponding to FIG. 9. braille information included in each of the braille image data d1 to d4 corresponds one-to-one to character data shown in each of the buttons b11 to b14. The image data in FIG. 9 and used for the later-mentioned operation screen is memorized in the memory 130. Moreover, the braille data (image data) for braille as shown in FIG. 10 is memorized in the memory 130 or a memory of the guide device 200.

At the time of a normal mode, by touching each of the buttons b with a finger, a process corresponding to each of the buttons b is executed. For example, by touching the button b11, an operation screen is changed to a setting screen with regard to copy. In a visually impaired person mode mentioned later, by a matter that a user having worn the guide device 200 touches a button b on the operation screen with the finger cover 292, the corresponding braille image data d is displayed on the braille display 220. In concrete terms, for example, by touching any position within a frame (square frame) of the button b11 on the surface of the touch panel 120 with the finger cover 292, the braille image data d1 corresponding to the button b11 is transmitted from the main body apparatus 100 to the guide device 200 through wireless communication. Then, the guide device 200 displays the received braille image data d1 on the braille display 220. In this connection, in the example shown FIG. 10, the braille image data d1 includes six pieces of data in which each piece of data is represented by a combination of six pins. Each data may be displayed sequentially at predetermined time intervals by the braille display 220. With a sliding operation within the button b11 by a user, the six pieces of data may be displayed while being scrolled. Moreover, the braille image data d1 includes not only braille information, but also may be made to include figures, such as frame lines surrounding the whole of them.

(Control Method)

Figure 11A:
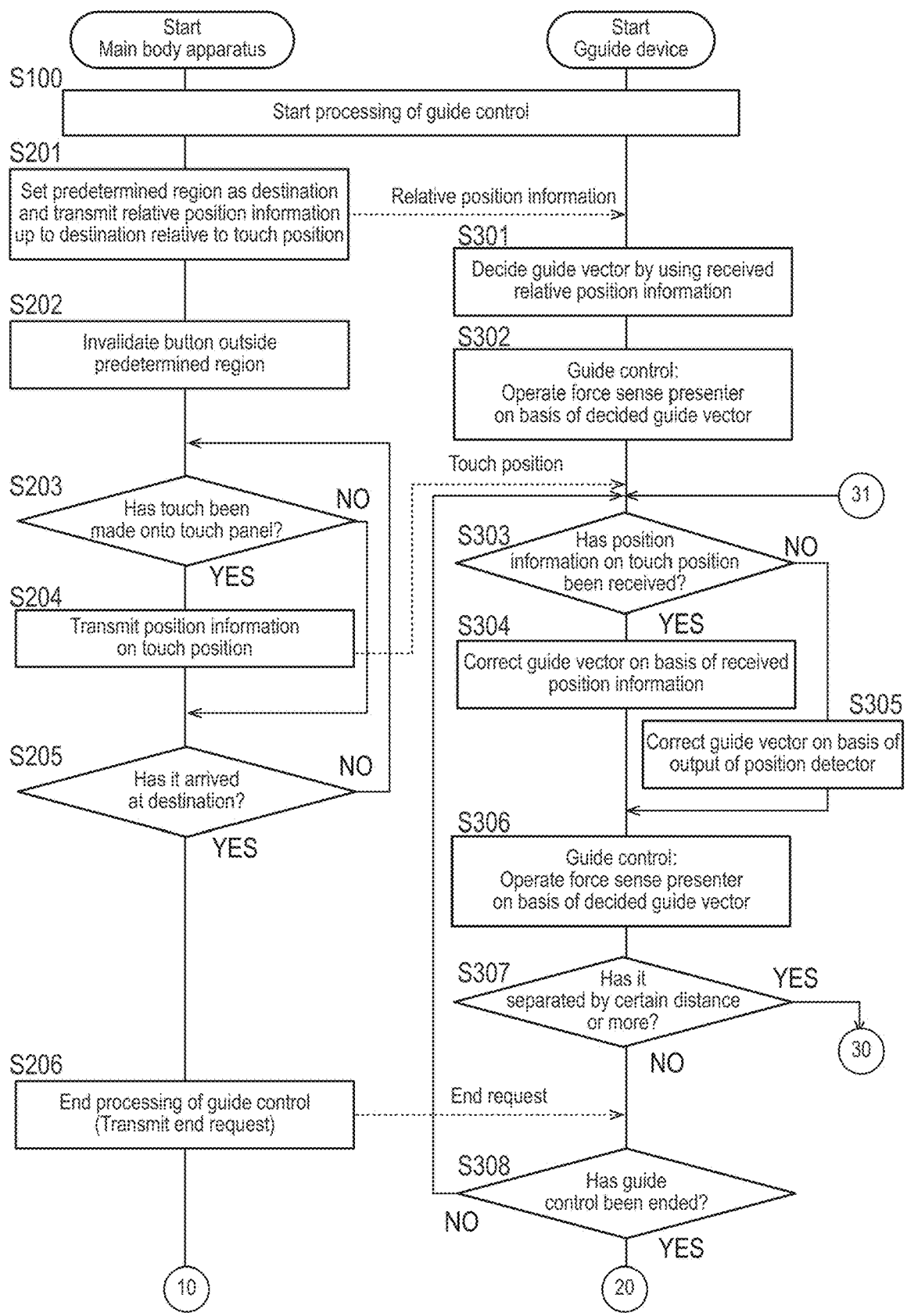
FIG. 11A is a flowchart showing control executed in a control system in the present embodiment.
Figure 11B:
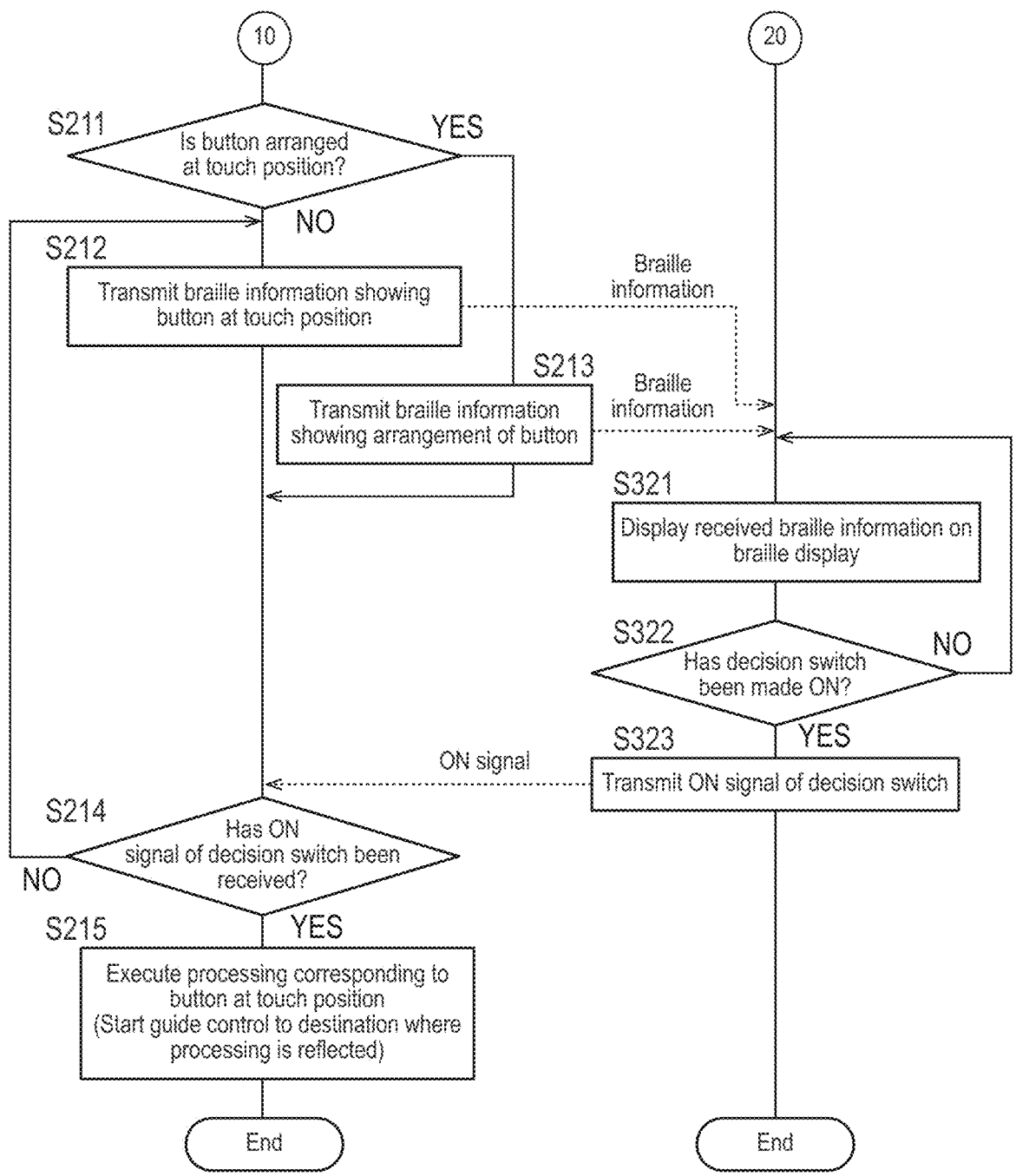
FIG. 11B is a flowchart following FIG. 11A.
Figure 11C:
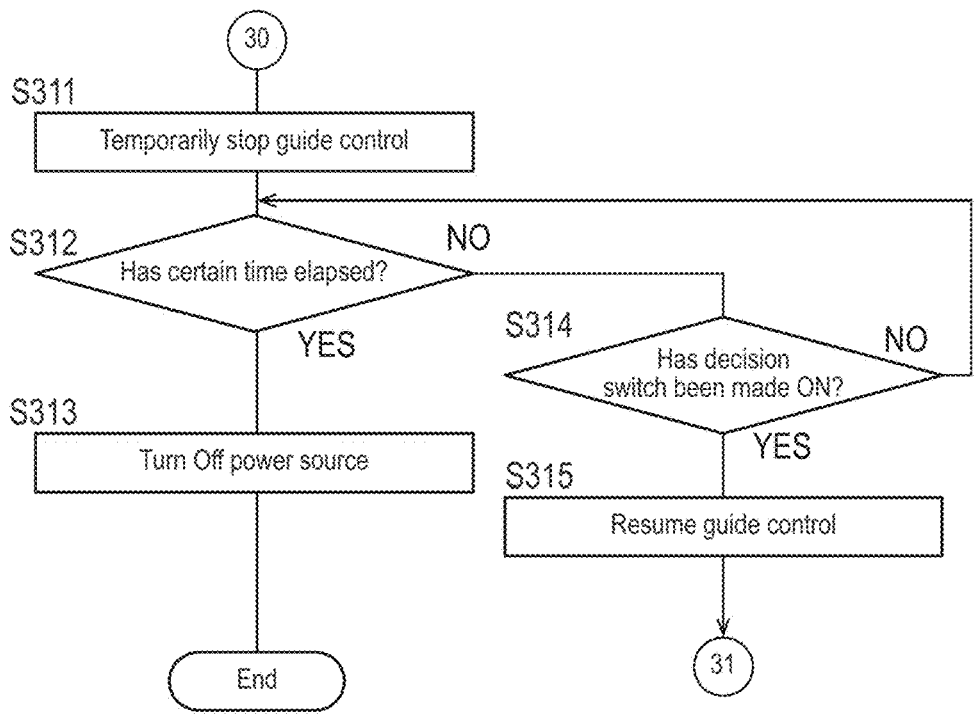
FIG. 11C is a flowchart following FIG. 11A and executed in the guide device.
Figure 12:
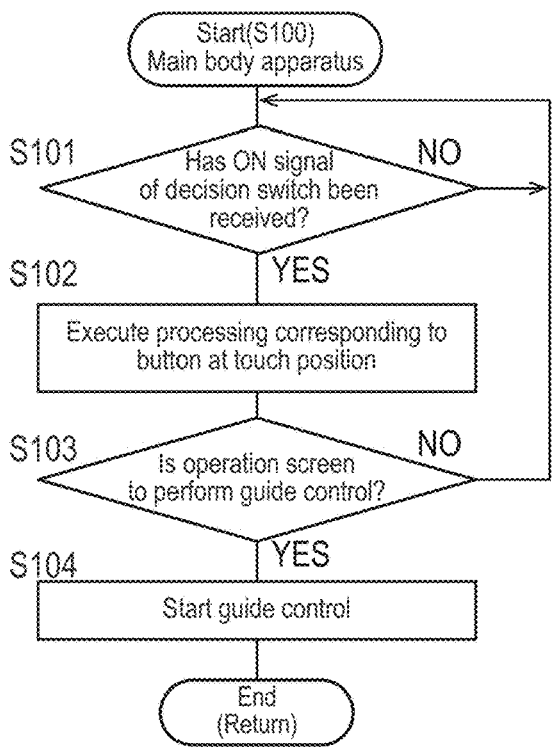
FIG. 12 is a subroutine flowchart in Step S100 in FIG. 11A.

With reference to FIG. 11A to FIG. 14B, description is given to a control method in a visually impaired person mode to be executed in a control system 500 relating to the present embodiment. FIGS. 11A to 11C are flowcharts showing control executed by the main body apparatus 100 and the guide device 200, and FIG. 12 is a subroutine flowchart of Step S100 executed in the main body apparatus 100.

(Step S100)

Here, the processor 110 of the main body apparatus 100 and the processor 210 of the guide device 200 cooperate with each other, thereby performing the start processing of a guide control. This start processing of the guide control can be performed, for example, by any of the following (i) to (iii).

(i) By a matter that the guide device 200 is activated and wireless communication is established with the main body apparatus 100, a guide control is started.

(ii) While the wireless communication in the above-described (i) is being established, further, by receiving an ON signal from the guide device 200, a guide control is started. Moreover, the ON signal at this time may be an ON signal of the decision switch 230, or may be another ON signal. For example, the ON signal is an ON signal for starting a guide control output in the case where the decision switch 230 has been pressed longer than a normal operation, or output in the case where another switch different from the decision switch 230 (for example, a tact switch disposed on an upper portion of the unit case 293) has been turned ON.

(iii) In response to a matter that below-described processing in FIG. 12 is performed, a guide control is started.

(Subroutine in Step S100)

(Step S101)

FIG. 12 is a subroutine flowchart, as an example, on the main body apparatus 100 side corresponding to Step S100. As shown in FIG. 12, in the case of receiving an ON signal of the decision switch from the guide device 200 (YES) (processing similar to that in later-mentioned Step S314 and S214), the main body apparatus 100 advances the processing to Step S102.

(Step S102)

Figure 13A:
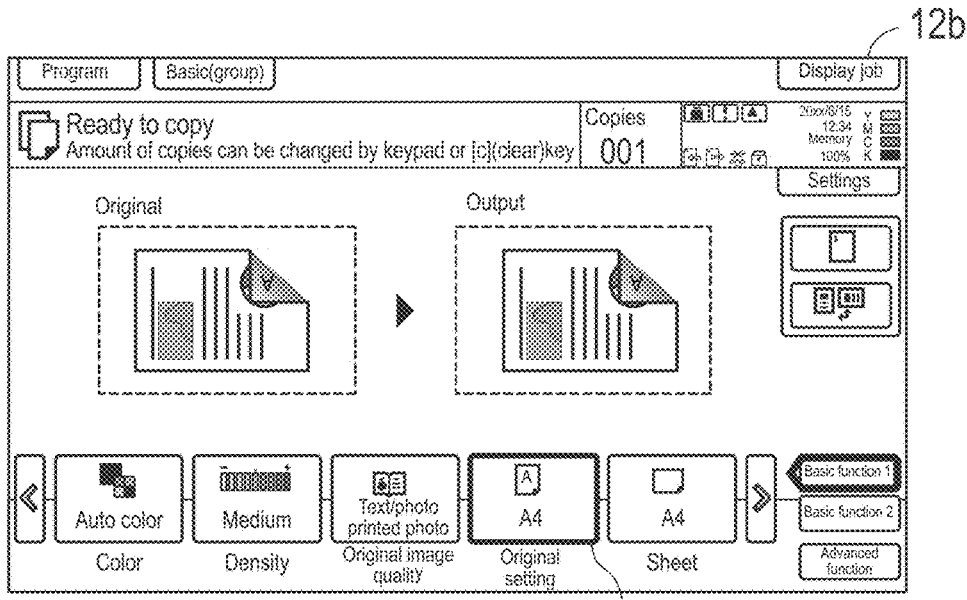
FIGS. 13A and 13B each is an example of an operation screen to be displayed on the touch panel.
Figure 13B:
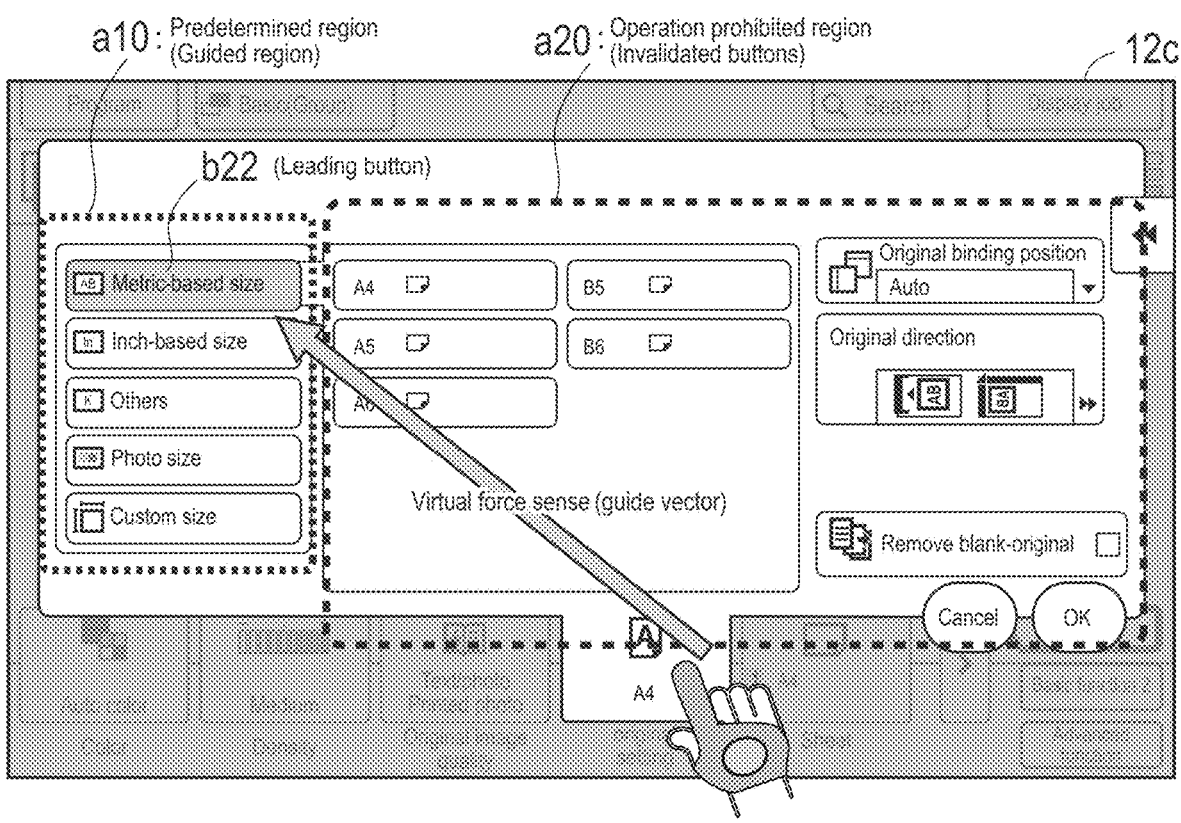

The processor 110 executes the processing corresponding to a button at a touch position by the guide device 200 at this time. FIGS. 13A and 13B each shows an example of an operation screen to be displayed on the touch panel. An operation screen 12b shown in FIG. 13A is an example of a basic screen to perform copy setting, and FIG. 13B shows an operation screen 12c positioned at a hierarchy one level lower than this operation screen 12b. For example, when an ON signal of the decision switch has been received, if the button b21 is touched on the operation screen 12b shown in FIG. 13A, the operation screen is changed to the operation screen 12c at a lower hierarchy than this.

(Step S103)

The processor 110 determines whether the operation screen is an operation screen to perform a guide control. The operation screen 12b in FIG. 13A is not an operation screen at a lower hierarchy or is not one in which a display mode or an arrangement of the buttons b will be changed with pop-up etc. by a matter that any of the buttons b is operated. Furthermore, since the operation screen 12b is one to request to look for a desired button b by tracing the displayed button b, the operation screen 12b is an operation screen on which a guide control is not performed ("first type operation screen" mentioned later). On the other hand, the operation screen 12c is a screen of a lower hierarchy after the changing of the screen, and immediately after the changing of the screen, a user (visually impaired person) does not have information with regard to the arrangement of the buttons b. From such a situation, the operation screen 12c is classified into the operation screen on which a guide control is performed ("second type operation screen" mentioned later).

In such an operation screen 12c, since it is an operation screen on which a guide control is performed (YES), the processing is advanced to Step S104.

(Step S104)

The main body apparatus 100 transmits a guide control start request to the guide device 200 and then receives a confirmation signal (ACK signal) (not shown) from the guide device 200, thereby starting a guide control and returning to the processing shown in FIG. 11A (End (Return)).

(Step S201)

The processor 110 sets a predetermined region to a destination and transmits relative position information up to the destination relative to a current touch position to the guide device 200. Here, the "predetermined region" is a region where one or a plurality of buttons b for performing the next selection operation are arranged and is a region to which a touch position of a user is guided. At this time, in the case where a plurality of buttons b is included in the predetermined region and the buttons have a rank, the touch position may be made to be guided up to the leading button b. For example, in the case of the operation screen 12c after the changing of the screen in FIG. 13B, a predetermined region a10 in which a button b to be selected first has been disposed is the predetermined region. Here, especially, description is given on the assumption that a leading button b22 in the predetermined region a10 is to be set as a destination.

Moreover, this "relative position information" is position information that shows a distance and a direction to connect the coordinates of a destination relative to the coordinates of the current touch position on the display surface of the touch panel 120. With a spread direction of the display surface of the touch panel 120, it is possible to grasp it on the basis of the signals of the angle detector 181. The position of the destination is corrected on the basis of the grasped installation angle θx, and the relative position information may be also made relative position information based on the destination to which the correction has been reflected.

(Step S202)

The processor 110 invalidates the buttons b outside the predetermined region a10. In concrete terms, the buttons b in an operation prohibited region a20 are invalidated, and even if a touch is made to the position of the invalidated button b, the button b is not made to function, and the braille information that shows the contents of the button b is not transmitted to the guide device 200. In this case, in the case of a healthy person, the invalidated button b can be recognized visually (visible). However, since braille information is not displayed, a visually impaired person will be in a state incapable of recognizing the invalidated button b. In this connection, the cancel of the operation prohibited region having been set is performed at a time when the guide control has been completed (Step S206 mentioned later).

(Step S301)

The processor 210 of the guide device 200 decides a vector (hereinafter, also referred to as a "guide vector") of a virtual force sense in response to receiving the "relative position information" by the processing in Step S201 of the main body apparatus 100. At this time, at the time of having touched the touch panel 120 while extending a finger, the guide vector is decided in consideration of a distance and direction between the touch position (the position of a fingertip) and the generated position (corresponding to the main body 265) of a virtual force sense by the force sense presenter 260 on the basis of a usual (average) shape (attitude) and orientation of the guide device 200.

In this connection, the shape and orientation of this guide device 200 may be determined on the basis of the output of the state detector 280 and may be reflected to the deciding of the guide vector. For example, between a state of stretching an index finger and a state of bending the index finger, a distance and direction between a touch position and a generated position of a virtual force sense are different. Accordingly, an orientation (mainly, an orientation of a finger) and shape of the guide device 200 having been grasped by this state detector 280 are caused to be reflected.

Moreover, the position detection by the gyro sensor 250 is reset with accompanying the start of the guide control, and thereafter, the grasping of the position by the gyro sensor 250 is performed on the basis of the position at the time of being reset, serving as a reference position.

(Step S302)

The processor 210 makes the force sense presenter 260 operate on the basis of the guide vector decided in Step S301 and presents a virtual force sense for a user. For example, a virtual force sense directed in the direction of an arrow shown in FIG. 13B is presented for the user. In this virtual force sense, its guide vector is set in a direction along a straight line connecting a generated position of a virtual force sense of the guide device 200 and a destination. This virtual force sense may be made to be generated only for a predetermined period (for example, about 1 second), or may be made to be generated successively continuously. Furthermore, in the case of presenting a virtual force sense only for a predetermined time period, when a normal operation for a decision switch, a long press operation for a decision switch, or an operation for another switch of the guide device 200 has been made, a virtual force sense may be made to be presented for the user by the force sense presenter 260 for each time that such an operation has been made. Since a virtual force sense is presented whenever the user operates a switch, the presentation is effective when the direction of a destination is missed.

(Steps S203 and S204)

In the case of having detected a touch for the touch panel 120 (S203: YES), the processor 110 of the main body apparatus 100 transmits the position information on the touch position to the guide device 200 in Step S204. This position information on the touch position may be relative position information up to a destination.

(Step S205)

The processor 110 determines whether the guide device 200 has arrived from the touch position at the destination, and in the case where the guide device 200 has arrived at the destination (YES), the processing is made to advance to Step S206. In the case where the guide device 200 has not arrived at the destination, the processing after Step S203 will be repeated. In this connection, in the case where the position information detected by the position detector of the guide device 200, i.e., the gyro sensor 250, coincides with the destination, it may be determined that the guide device 200 has arrived at the destination. In this case, the guide device 200 transmits a signal showing that the guide device 200 has arrived at the destination, to the main body apparatus 100. With this signal, the processor 110 can perform the determination in Step S205.

(Step S206)

In the case where the guide device 200 has arrived at the destination, the processor 110 performs the ending process of the guide control. In concrete terms, in the case of transmitting an end request signal to the guide device 200, and then, in the case of receiving a confirmation signal (ACK signal) for it from the guide device 200, the guide control will be ended.

(Step S303)

In the case where the processor 210 of the guide device 200 receives the position information on a touch position correspondingly to the processing in Step S204 (YES), and the processor 210 advance the processing to Step S304. In contrast, in the case of not receiving it (NO), the processor 210 advance the processing to Step S305.

(Step S304)

The processor 210 corrects the guide vector on the basis of the received position information on the touch position. In concrete terms, the guide vector is corrected in real time on the basis of the touch position at a present time when having received and the position information on the destination. Moreover, at this time, in the case where there has arisen a shift between the current touch position and the current position detected by the position detector, this shift may be corrected sequentially.

(Step S305)

The processor 210 corrects the guide vector on the basis of the position information detected by the position detector (gyro sensor 250). In concrete terms, the guide vector is corrected in real time on the basis of position information at the present time and the position information on the destination.

Figure 14A:
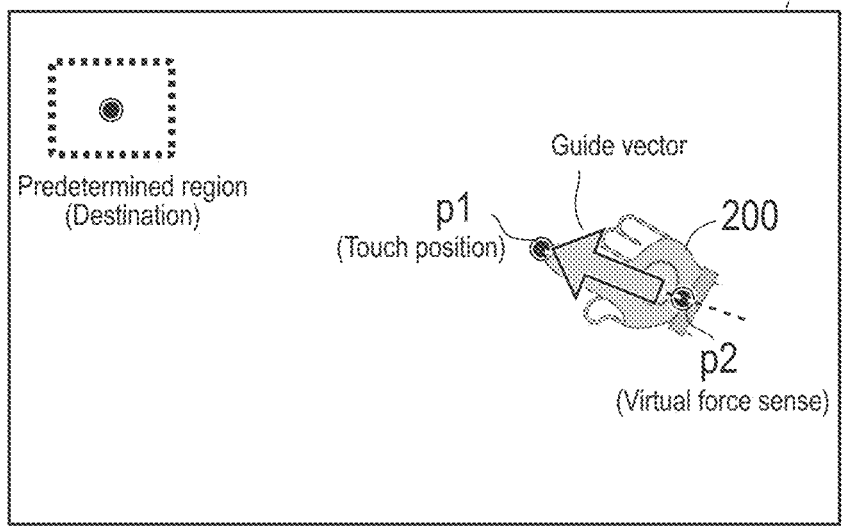
FIGS. 14A and 14B each is a schematic diagram for describing a relationship between a destination and a guide vector.
Figure 14B:
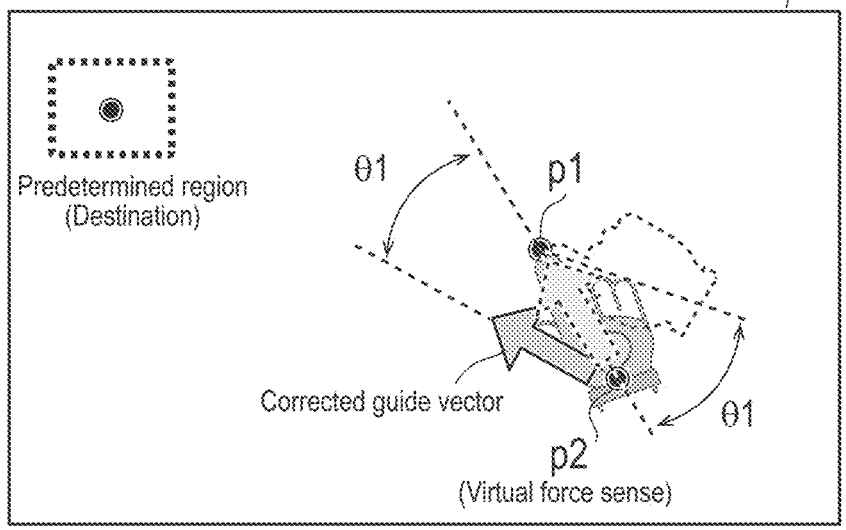

FIGS. 14A and 14B each is a schematic illustration describing the relation between a destination and a guide vector. FIG. 14A is an illustration showing a relation between a guide vector and the guide device 200 at a certain time. The guide vector is decided in consideration of a generated place p2 of a virtual force sense relative to a touch position p1 on an operation screen 12x. At this time, the guide vector faces the destination (along a straight line that connects the generated place of a virtual force sense with the destination).

FIG. 14B shows a state in which the orientation of the guide device 200 has been changed by changing the orientation of a hand by a user without changing the touch position p1. In this case, in response to a matter that the position of the generated place p2 of the virtual force sense has been changed by the output of the gyro sensor 250 and the orientation has changed by an angle θ1, the guide device 200 corrects the orientation of the guide vector by the same angle θ1 so as to face the destination as shown in FIG. 14B.

(Step S306)

The processor 210 makes the force sense presenter 260 generate a virtual force sense directed to the destination by using the vector corrected in Step S304 or S305 and presents the virtual force sense for the user.

(Step S307)

Here, the processor 210 determines whether the guide device 200 has separated from the main body apparatus 100 (especially, the touch panel 120) by a certain distance or more. In the above determination, it may be determined by a matter that short-distance wireless communication such as BLE has changed to a state of having been not established. Alternatively, a matter that the guide device 200 has separated from the touch panel 120 by a certain distance or more, may be determined on the basis of the output of the gyro sensor 250. In the case of having determined that it has separated by a certain distance or more (YES), the processor 210 advances the processing to Step S311 (a circled number 30, in FIG. 11C), and in the case of having determined that it has not separated by a certain distance or more (NO), the processor 210 advances the processing to Step S308.

(Step S308)

In the case where an end request signal has been sent from the main body apparatus 100, the processor 210 determines that the guide control has been ended (YES) and advances the processing to Step S321 (a circled number 20, in FIG. 11B). In the case where the guide control is not ended (NO), the processor 210 returns the processing to Step S303.

(Step S311)

As shown in FIG. 11C, the processor 210 temporarily stops the guide control.

(Step S312)

After having temporarily stopped the guide control, the processor 210 waits for a certain time to elapse and advances the processing to Step S314 until the certain time elapses. In the case where the certain time has elapsed, the processor 210 advances the processing to Step S313.

(Step S313)

The processor 210 turns OFF the power source of the guide device 200 and ends the processing (END).

(Step S314)

In the case where the processor 210 has detected that the decision switch 230 has been turned ON (YES), the processor 210 advances the processing to Step S315, and in the case where the decision switch 230 is not turned ON (NO), the processor 210 returns the processing to Step S312.

(Step S315)

The processor 210 determines the resumption of the guide control and returns the processing to Step S303 (a circled number 31, in FIG. 11A).

(Display Processing)

The processing shown in FIG. 11B relate to display processing performed when a guide to a destination has been completed.

(Step S211)

The processor 110 determines whether buttons to be operated are arranged at the touch position, and in the case where the buttons are not arranged (NO), the processor 110 advances the processing to Step S212. On the other hand, in the case where the buttons are arranged (YES), the processor 110 advances the processing to Step S213.

(Step S212)

The main body apparatus 100 transmits information with regard to the display contents of a touch position, i.e., braille information showing the button of the touch position.

(Step S213)

The main body apparatus 100 transmits braille information with regard to arrangement information showing the arrangement of buttons in the predetermined region a10 as arrangement information of buttons.

(Step S321)

Figure 15:
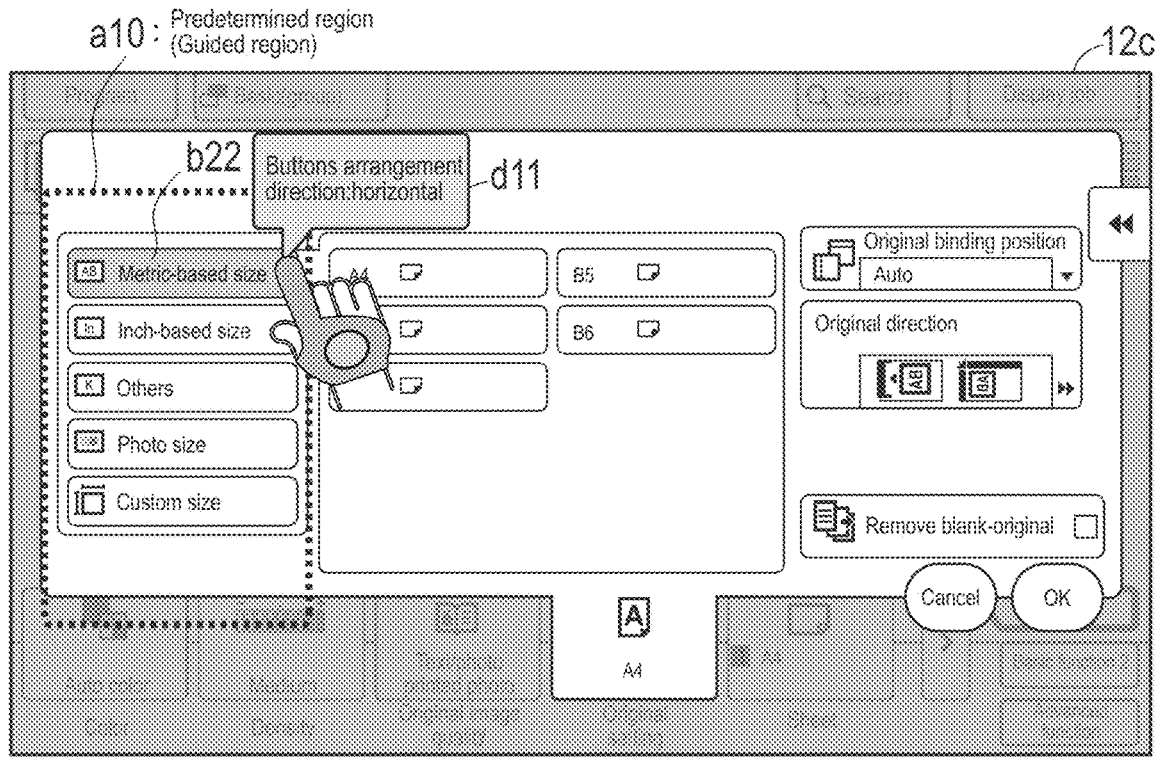
FIG. 15 is an example of an operation screen to be displayed on the touch panel.

The guide device 200 displays the received braille information on the braille display 220. FIG. 15 shows an example of the operation screen 12c to be displayed on the touch panel, and FIG. 15 shows schematically a state in which braille image data d11 of "arrangement of buttons: longitudinal direction" is displayed on the braille display 220 as the arrangement information transmitted in Step S213. This arrangement information is merely an exemplification, the total number of buttons b in a predetermined region or the position, direction, or the number in the direction of the other button b relative to a button b being touched at the present time may be used. For example, the arrangement information is the braille information representing "total five" or "four in a downward direction".

In the case where the braille information with regard to the arrangement information has been displayed in Step S321, after the predetermined time period has elapsed, the display may be stopped. For example, after several seconds have elapsed after having arrived at the predetermined region, the displaying of the arrangement information by the guide device 200 is made to be ended. Thereafter, the main body apparatus 100 makes the guide device 200 display the braille information representing the button b of the touch position.

(Step S322)

The user recognizes the content of the button b from the display content of the braille display 220. In the case where the content of the button b is a desired button b, the decision switch 230 is turned ON. In the case where the decision switch 230 has been turned ON (YES), the processor 210 advances the processing to Step S323. In the case where the decision switch 230 is not turned ON (NO), the processor 210 returns the processing to Step S321.

(Step S323)

The guide device 200 transmits the ON signal of the decision switch to the main body apparatus 100.

(Step S214)

In the case of receiving the ON signal of the decision switch (YES), the processor 110 of the main body apparatus 100 advances the processing to Step S215. On the other hand, in the case of not receiving the ON signal of the decision switch (NO), the processor 110 returns the processing to Step S212.

(Step S215)

The processor 110 executes the processing corresponding to the button of the touch position by the guide device 200 at this time and ends the processing (END).

Figure 16:
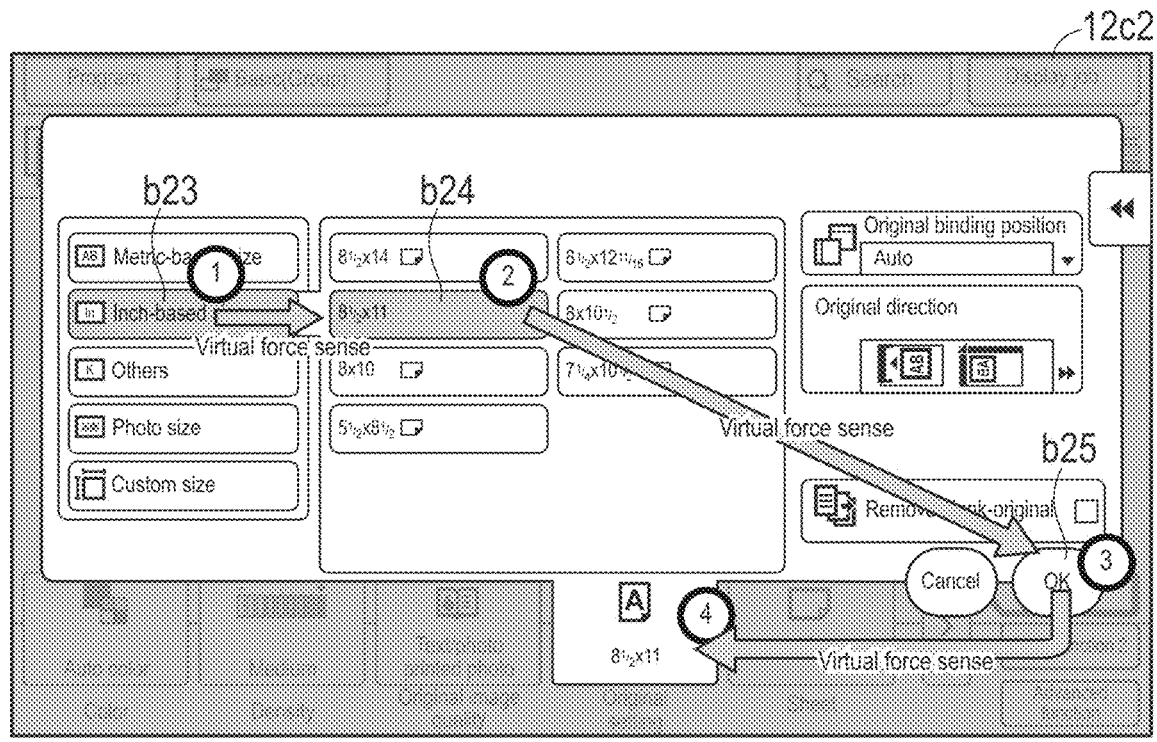
FIG. 16 is an example of an operation screen to be displayed on the touch panel.

Moreover, as described in the below, at this time, a region to which the processing has been reflected, is made a predetermined region, and the next guide control in which the predetermined region is made a destination, may be started. FIG. 16 shows an example of the operation screen 12c2 to be displayed on the touch panel, and FIG. 16 shows transition of destinations of guide controls to be performed sequentially. In FIG. 16, after a guide control 1 (a circled number 1 in the drawing (hereafter, circled numbers are used in the same way in the drawing)) has been completed, by turning ON the decision switch while touching the button b23, the button b23 is selected, and the processing corresponding to this button b23 is executed (Steps S214 and S215). Thereafter, the next guide control 2 in which the button b24 is made the destination is performed. Then, similarly, by a matter that the button b24 is selected, a guide control 3 directed to the button b25 is performed. Thereafter, by a matter that the button b25 is selected, the set value is changed ("8.5×11"), and a guide control 4 up to the next destination showing that it has been reflected, is performed.

In this way, in the present embodiment, in the case where, relative to a touch position onto the touch panel 120, a position to perform the next operation on an operation screen is made a destination, the guide device 200 equipped with the force sense presenter 260 that makes a user wearing it generate a virtual force sense, makes the force sense presenter 260 generate a guide-use virtual force sense directed toward the destination by using relative position information up to the destination relative to the touch position. With this, since the user can grasp easily sensuously a position to perform the next operation, the next operation can be performed quickly. Especially by performing the guide control along a direction connecting linearly between the touch position and the destination, the guide is achieved with the shortest distance, whereby the guide time can be shortened.

Moreover, the position at a time when the guide control is started and the current position are detected by the position detector (gyro sensor 250). Then, the position detected at the time when the guide control is started is made a reference position, and on the basis of this reference position, the current position, and position information on a destination, a guide vector of a virtual force sense is corrected in real time. With this, the guide control can be performed more accurately. Moreover, in the case where a touch is made to the touch panel 120 by the guide device 200 during the guide control, on the basis of the touch position, the guide vector of the guide control is corrected in real time. With this, the guide control can be performed more accurately.

Moreover, correspondingly to the direction or shape of the guide device 200 detected by the state detector 280, changes in a distance and direction between a touch position of a fingertip and a generated place of a virtual force sense are grasped, and then, on the basis of the grasped changes, the guide vector is corrected. With this, the guide control can be performed more accurately.

Moreover, in the present embodiment, a visually impaired person commonly uses the operation screens (12a, 12b, 12c, etc.) that a healthy person uses. With this, by making the display contents of an operation screen common between the normal mode and the visually impaired person mode, since there is no need to newly prepare an operation screen for the visually impaired person mode, it is possible to reduce man-hours with regard to the creation of display data.

However, in the case of using the same user interface (UI) as a healthy person, generally the number of buttons tends to increase. However, to know the contents of each button, it is necessary for a visually impaired person to touch buttons one by one by a fingertip and to read the braille information corresponding to the contents of the button through the guide device 200. Accordingly, it is unkind to make the visually impaired person read many buttons. In view of such a situation, in the present embodiment, on the basis of the setting information memorized in the memory 130, the outside of the predetermined region is set to an operation prohibited region. Then, the buttons in the region are deemed not to exist in the region, the subsequent operations for the buttons are prohibited, and the braille display by the guide device 200 does not perform for the region. By doing in this way, since the visually impaired person can acquire only required information, it is possible to perform operation for the main body apparatus 100 easily.

(Modified Example)

Figure 17:
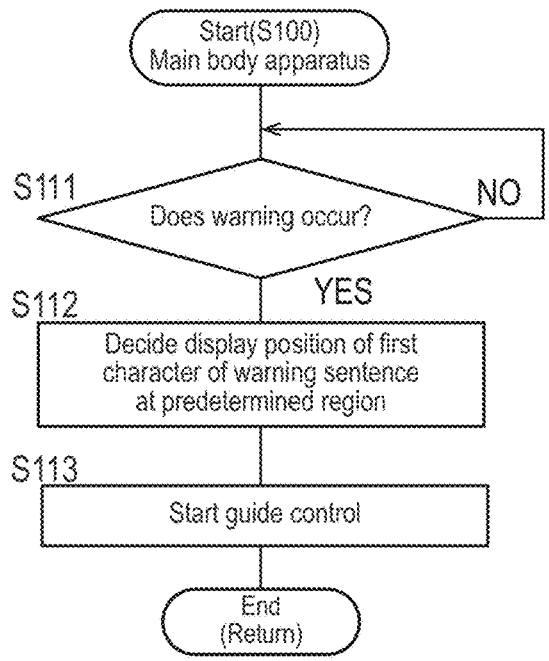
FIG. 17 is a subroutine flowchart in Step S100 in a modified example.

Next, a modified example will be described. The modified example is a guide control performed in the case of displaying a warning screen. FIG. 17 is a subroutine flowchart showing control of the main body apparatus 100 in the modified example.

(Step S111)

The processor 110 detects occurrence of faults, such as depletion of consumables, i.e., no paper for printing, no toner, and the like, and a paper jam, in the main body apparatus 100. Faults occur, and then, in the case of displaying a warning screen that urges a user to take a countermeasure (YES), the processor 110 advances the processing to Step S112.

(Step S112)

Figure 18:
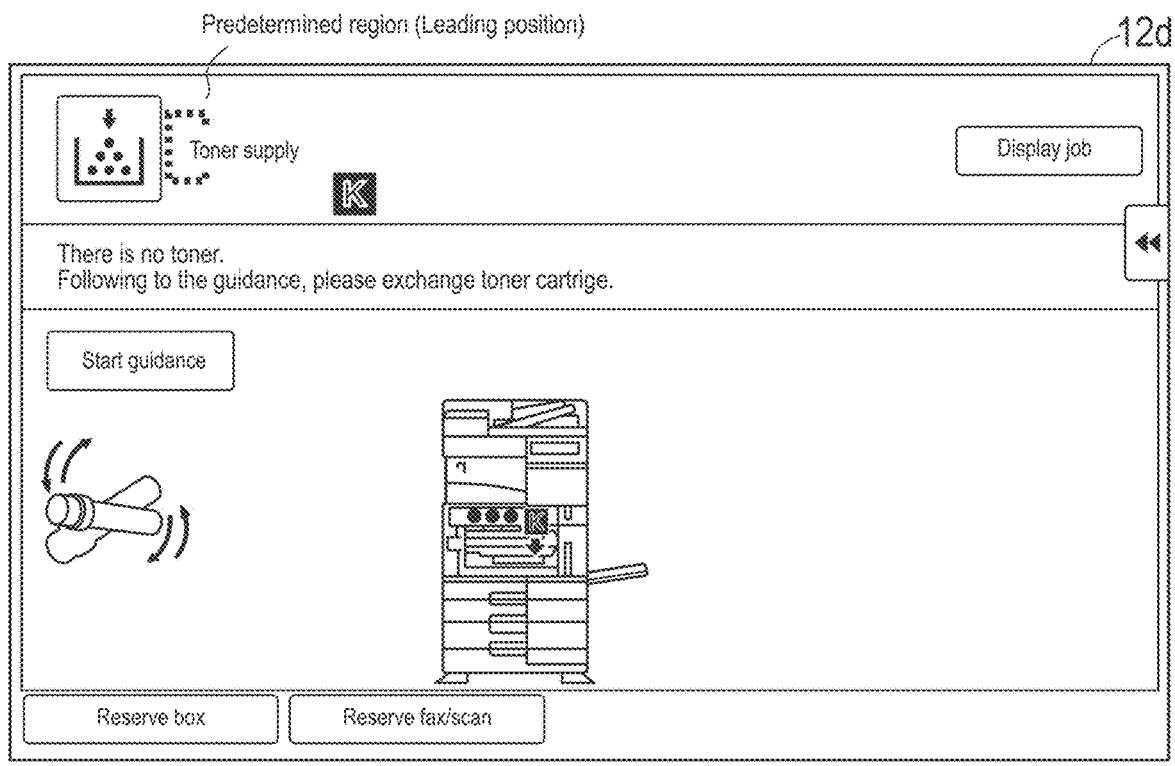
FIG. 18 is an example of a warning screen to be displayed on the touch panel.

FIG. 18 is an example of the warning screen 12d to be displayed on the touch panel 120, which is displayed in the case where no toner to be used in the printer 140, occurs. In this connection, at this time, the processor 110 may output warning sound through the speaker 190. The warning sound may be beep sound, or may be voice describing the contents of a warning sentence.

In the warning screen 12d as shown in FIG. 18, the processor 110 guides a user to a leading position of the warning sentence. In FIG. 18, the character of "T" being the first character of "Toner supply" is the leading position of the warning sentence, and the processor 110 sets this leading position in a predetermined region.

The main body apparatus 100 transmits a guide control start request to the guide device 200 similarly to Step S104 and then receives a confirmation signal (ACK signal) for it from the guide device 200, thereby starting a guide control, and then returns to the processing in FIG. 11A, and performs the processing after Step S100 (END (RETURN)).

In this way, in the modified example, in the case of displaying a warning screen, a guide control directed towards the leading character of a warning sentence is executed. With this, faults occur, and then, in the case of having switched to a warning screen, a user can grasp a situation of the control system 500 easily. Even if an operation screen used by a healthy person is shared with a visually impaired person, the visually impaired person can use the operation screen without being puzzled.

(Others)

Figure 19A:
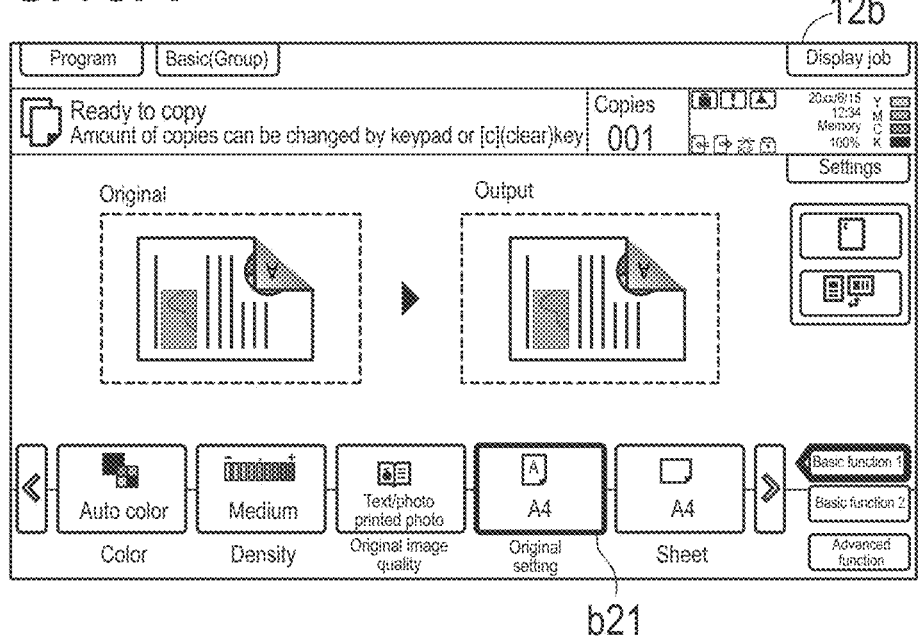
FIGS. 19A and 19B each is an example of an operation screen to be displayed on the touch panel.
Figure 19B:
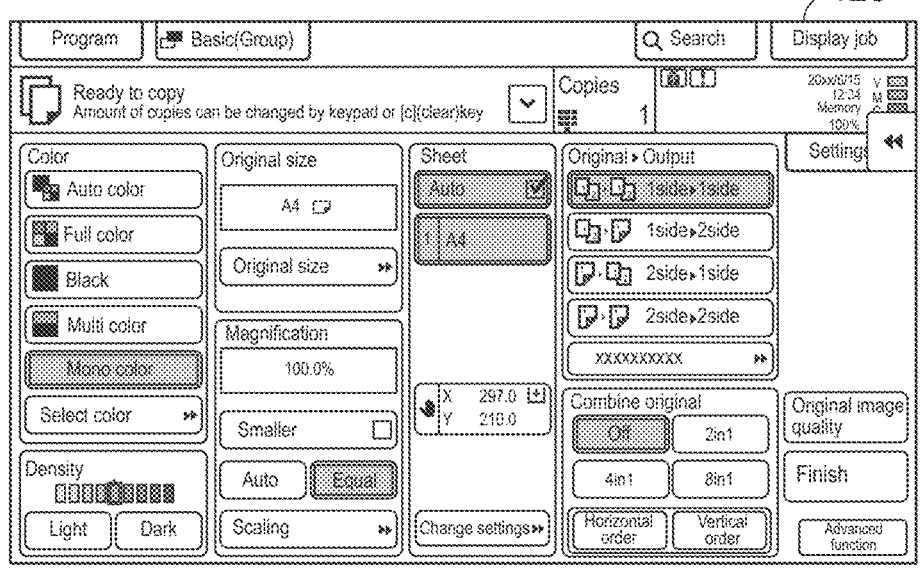

The above-mentioned operation screen used in common in the normal mode and a visually impaired person mode includes a first type operation screen that does not perform a guide control and a second type operation screen that performs a guide control. In FIGS. 19A and 19B, the operation screens 12b and 12e each is an example of the first type operation screen that do not perform a guide control. On the other hand, the operation screens 12c, 12c2 (in FIG. 15, FIG. 16) and the operation screen 12d (in FIG. 18) each is the second type operation screen that performs a guide control.

The first type operation screens 12b and 12e each is not an operation screen of a lower hierarchy and is not one in which a display mode or the arrangement of the buttons b is changed by pop-up etc. in response to an operation for one of the buttons b. Moreover, since they are one that requests to look for a desired button b by tracing the displayed buttons b, a guide control is not performed. On the other hand, the second type operation screens 12c (12c2) and 12d each is an operation screen of a lower hierarchy, and immediately after the screen transition, there is no information with regard to the arrangement of the buttons b for a user (visually impaired person). Therefore, a guide control is performed.

With regard to the constitution of the control system equipped with the main body apparatus 100 and the guide device 200 described in the above, the main constitution has been described in order to describe the feature of the above-described embodiment. Accordingly, the constitution according to the invention is not limited to the above-described constitution, and within a scope of claims, various modifications can be made as described in the below. Moreover, constitutions equipped in a general main body apparatus 100 and guide device 200 are not excluded.

For example, in the above-mentioned embodiment, the speaker 190 may be used together with the braille display 220 of the guide device 200. In concrete terms, the display contents of the operation screens displayed in each of the embodiments may be notified to a visually impaired person with voice through a speaker. Moreover, in the above-mentioned embodiment, although the guide control to a destination has been performed by a virtual force sense by the force sense presenter 260, together with this, a guide control by a braille display by the braille display 220 may be performed. For example, in the example in FIG. 13B, the braille display of "left" or "upper" made to face towards the upper left is performed so as to guide to a destination.

A mechanism and method of performing various kinds of processing in the guide device, the main body apparatus, and the control system relating to each of the above-mentioned embodiments and modified example can be implemented either by dedicated hardware or programmed computer. The above-mentioned program may be provided, for example, by a computer readable recording medium, such as a compact disc read only memory (CD-ROM), or may be provided on-line through networks, such as the Internet. In this case, the program recorded in the computer readable recording medium is usually transferred to a memory, such as a hard disk, and is memorized in the memory. Moreover, the above-mentioned program may be provided as independent application software, or may be included in the software of an apparatus as one function of a control system.

Although embodiments of the present invention have been described and illustrated in detail, the disclosed embodiments are made for purpose of illustration and example only and not limitation. The scope of the present invention should be interpreted by terms of the appended claims.

What is claimed is:

1. A visually impaired person-use guide device that is worn on a hand of a user and is able to communicate with a main body apparatus equipped with a touch panel to detect a touch onto an operation screen,
the guide device comprising:
   a force sense presenter that makes the user having worn generate a virtual force sense;
   a guide device communicator that performs wireless communication with the main body apparatus; and
   a guide device processor that, in a case where a predetermined region to perform a next operation on the operation screen relative to a touch position onto the touch panel is made a destination, performs a guide control to make the force sense presenter generate a guide-use virtual force sense directed to the destination by using relative position information, received from the main body apparatus, up to the destination relative to the touch position.

2. The guide device according to claim 1, wherein the guide device processor performs the guide control along a straight line connecting the guide device and the destination by using the relative position information.

3. The guide device according to claim 1, comprising
   a finger cover that covers a fingertip of the user having worn; and
   a braille display that is disposed in an inside of the finger cover and is able to display braille information,
   wherein a display content, received from the main body apparatus, of the operation screen at the touch position on the touch panel is displayed on the braille display.

4. The guide device according to claim 1, further comprising:
   a position detector that detects position information on the guide device,
   wherein the guide device processor corrects a vector direction of the virtual force sense in the guide control by using position information detected by the position detector when starting the guide control, position information on the destination calculated from the relative position information received from the main body apparatus, and current position information detected by the position detector.

5. The guide device according to claim 4, further comprising:
   a state detector that detects an orientation or shape of the guide device,
   wherein the guide device processor corrects the vector direction correspondingly to the orientation or shape of the guide device detected by the state detector.

6. A control system comprising:
   a main body apparatus that receives operation; and
   a visually impaired person-use guide device that is worn on a hand of a user,
   wherein the main body apparatus includes
   a touch panel that displays an operation screen on a display surface and detects a touch to the display surface,
   a main body communicator that performs wireless communication with the guide device, and
   a main body processor,
   the guide device includes
   a force sense presenter that makes the user having worn generate a virtual force sense,
   a guide device communicator that performs wireless communication with the main body apparatus, and
   a guide device processor, and
   wherein in a case where a touch has been made to the touch panel by the user having worn the guide device, the main body processor sets a predetermined region to perform a next operation as a destination on the operation screen being displayed and transmits relative position information up to the destination relative to a touch position of the touch, and the guide device processor performs guide control to make the force sense presenter generate a guide-use virtual force sense directed to the destination by using relative position information.

7. The control system according to claim 6, wherein the guide device processor performs the guide control along a straight line connecting the guide device and the destination by using the relative position information.

8. The control system according to claim 6, wherein the guide device includes:
   a finger cover that covers a fingertip of the user having worn; and
   a braille display that is disposed in an inside of the finger cover and is able to display braille information,
   wherein the main body apparatus transmits information on the display content of the operation screen at the touch position of the touch panel to the guide device, and
   the guide device displays the information received from the main body apparatus on the braille display.

9. The control system according to claim 8, wherein the guide device further includes:
   a position detector that detects position information on the guide device,
   wherein on the basis of the position information detected by the position detector, the guide device processor determines whether a guide to the destination has been completed or not, and in a case where the guide has been completed, the guide device processor ends the guide control and displays the information with regard to a display content received from the main body apparatus on the braille display.

10. The control system according to claim 8, wherein on a basis of a touch position on the touch panel, the main body processor determines whether a guide to the destination has been completed, in a case where the guide has been completed,
   the main body processor transmits an end request of the guide control and information with regard to a display content of the operation screen at the touch position to the guide device, and
   the guide device processor ends the guide control with receiving the end request and displays the information with regard to the display content received from the main body apparatus on the braille display.

11. The control system according to claim 8, wherein the guide device processor further displays guide-use information directed to the destination as the guide control.

12. The control system according to claim 8, wherein the predetermined region set as the destination includes a plurality of buttons, and
in a case where a guide to the destination has been completed, the main body processor makes the braille display indicate arrangement information on the plurality of buttons.

13. The control system according to claim 6, wherein the guide device further includes a position detector that detects position information on the guide device, and
the guide device processor corrects a vector direction of the virtual force sense in the guide control by using position information detected by the position detector when starting the guide control, position information on the destination calculated from the relative position information received from the main body apparatus, and current position information detected by the position detector.

14. The control system according to claim 13, wherein the guide device further includes a state detector that detects an orientation or shape of the guide device, and
the guide device processor corrects the vector direction correspondingly to the orientation or shape of the guide device detected by the state detector.

15. The control system according to claim 13, wherein in a case where a touch has been made onto the touch panel by the guide device during the guide control, the main body processor transmits position information on the touch to the guide device, and
wherein in a case where the guide device processor has received the position information on the touch, the guide device processor corrects a vector direction of the virtual force sense in the guide control by using the position information on the touch, and
in a case where the guide device processor does not receive the position information on the touch, the guide device processor corrects a vector direction of the virtual force sense in the guide control by using position information detected by the position detector when starting the guide control, position information on the destination calculated from the relative position information received from the main body apparatus, and current position information detected by the position detector.

16. The control system according to claim 6, wherein in a case where a state in which the touch panel is not touched by the guide device continues for a predetermined time or longer, or in a case where the guide device is separated from the touch panel by a predetermined distance or more, the main body processor ends the guide control.

17. The control system according to claim 6, wherein the main body apparatus includes a tilt mechanism capable of changing an installation angle of the display surface of the touch panel, and
the main body processor transmits information on the installation angle set by the tilt mechanism, and
the guide device processor corrects a position of the destination on a basis of the received information on the installation angle.

18. The control system according to claim 6, wherein the operation screen includes a plurality of operation screens with a hierarchical structure, and
when the operation screen has transited to an operation screen of another hierarchy associated in response to a selection operation for buttons on the operation screen, the main body processor sets a leading button on the transited operation screen as the predetermined region on the destination.

19. The control system according to claim 6, wherein the operation screen includes a first type operation screen on which the guide control is not performed and a second type operation screen on which the guide control is performed.

20. The control system according to claim 6, wherein the guide device further includes a switch, and
in response to a matter that the switch has been operated by a user, the guide control is started.

21. The control system according to claim 20, wherein for each time when the switch has been operated by a user, the virtual force sense is generated by the force sense presenter.

22. The control system according to claim 6, wherein when the guide control to guide a user to the destination within the operation screen is being executed, the main body processor invalidates an operation made for buttons located other than the predetermined region set as the destination within the operation screen, and after the guide up to the destination has been completed, the main body processor makes an operation made for the buttons located other than the predetermined region, valid.

23. The control system according to claim 6, wherein the operation screen includes a plurality of operation screens with a hierarchical structure that includes an operation screen of a first hierarchy and an operation screen of a lower second hierarchy that performs setting with regard to setting items of the operation screen of the first hierarchy, and
wherein the main body processor makes the operation screen transit to the operation screen of the lower second hierarchy associated in response to an selection operation of buttons on the operation screen of the first hierarchy, and thereafter, in a case where the setting has been ended and the operation screen returns to the operation screen of the first hierarchy,
a predetermined region displaying the setting item to which the setting is reflected, is made the destination, and the guide control is performed.

24. The control system according to claim 6, wherein in a case of having displayed a warning screen that urges a user to take a countermeasure for the control system, the main body processor makes a leading position of a warning sentence within the warning screen the destination and performs the guide control.

25. The control system according to claim 6, wherein the main body processor notifies a user of a display content of the operation screen at a touch position onto the touch panel by transmitting braille information, and wherein it is possible to switch a visually impaired person mode that performs selection operation for buttons at the touch position by an operation to a switch different from the touch panel and a normal mode that performs selection operation for the buttons by a touch to the button on the touch panel, and
a common operation screen is displayed in the normal mode and in the visually impaired person mode.

26. A non-transitory control medium storing a computer readable program that makes a computer control a control system including a main body apparatus that receives operation through a touch panel and a visually impaired person-use guide device that is worn on a hand of a user and includes a force sense presenter that makes the user having worn generate a virtual force sense, the control by the computer comprising:

(a) setting a position of a predetermined region to perform a next operation as a destination on an operation screen being displayed in a case where a touch has been made onto the touch panel by the user having worn the guide device; and
(b) performing a guide control to make the force sense presenter generate a guide-use virtual force sense directed to the destination by using relative position information up to the destination relative to the touch position.

* * * * *